US012687069B2

(12) United States Patent
Lentine et al.

(10) Patent No.: US 12,687,069 B2
(45) Date of Patent: Jul. 21, 2026

(54) REMOTE EXTENDABLE LADDER AND METHODS

(71) Applicant: Werner Co., Itasca, IL (US)

(72) Inventors: Tek Lentine, Aurora, IL (US); Thomas W. Parker, Jamestown, PA (US); David S. Pozgay, Wilmette, IL (US)

(73) Assignee: Werner Co., Itasca, IL (US)

( * ) Notice: Subject to any disclaimer, the term of this patent is extended or adjusted under 35 U.S.C. 154(b) by 1104 days.

(21) Appl. No.: 17/556,997

(22) Filed: Dec. 20, 2021

(65) Prior Publication Data

US 2022/0220805 A1 Jul. 14, 2022

Related U.S. Application Data

(60) Provisional application No. 63/135,228, filed on Jan. 8, 2021.

(51) Int. Cl.
*E06C 1/32* (2006.01)
*E06C 7/04* (2006.01)

(52) U.S. Cl.
CPC . *E06C 1/32* (2013.01); *E06C 7/04* (2013.01)

(58) Field of Classification Search
CPC .................................... E06C 1/32; E06C 7/04
USPC ........................................................... 182/24
See application file for complete search history.

(56) References Cited

U.S. PATENT DOCUMENTS 150,394 A * 5/1874 Carnes ...................... E06C 1/32 182/208
180,733 A * 8/1876 Small ........................ E06C 1/32 182/213
257,463 A * 5/1882 Boyd ........................ E06C 1/32 182/172
501,378 A * 7/1893 Splann ...................... E06C 1/32 182/208
1,651,478 A * 12/1927 Skeels ....................... E06C 1/32 182/213
3,363,721 A * 1/1968 Petix ....................... E06C 1/393 182/211
4,210,224 A * 7/1980 Kummerlin ............... E06C 1/12 182/166
4,371,055 A * 2/1983 Ashton ................... E06C 7/081 182/194

(Continued)

FOREIGN PATENT DOCUMENTS

CN 209875031 12/2019
KR 200411310 3/2006
KR 100949777 3/2010

*Primary Examiner* — Daniel J Troy
*Assistant Examiner* — Timothy M Ayres
(74) *Attorney, Agent, or Firm* — Fitch, Even, Tabin & Flannery LLP

(57) ABSTRACT

A multipurpose ladder having a first pulley attached adjacent a top of a first base right rail. The ladder includes a first anchor attached adjacent a bottom of the first fly right rail. The ladder comprises a first cable having a free end and a fixed end. The fixed end attached to the first anchor. The first cable extending from the first anchor about the first pulley and past the first pulley so the free end extends past the first pulley. When the free end is pulled, the first fly right rail is moved relative to the first base right rail by the first cable engaged with the first pulley and the fixed end attached to the first anchor. A method for using a multipurpose ladder. A method for producing a multipurpose ladder.

9 Claims, 18 Drawing Sheets

(56) References Cited

U.S. PATENT DOCUMENTS

| | | | | |
|---|---|---|---|---|
| 6,866,117 | B2 * | 3/2005 | Moss | E06C 1/32<br>182/228.3 |
| 7,007,344 | B2 * | 3/2006 | Lee | E06C 1/32<br>403/68 |
| 11,851,949 | B2 * | 12/2023 | Lentine | E06C 1/22 |
| 2022/0025701 | A1 * | 1/2022 | Scheurich | E06C 7/04 |

* cited by examiner

REMOTE EXTENDABLE LADDER AND METHODS

CROSS-REFERENCE TO RELATED APPLICATIONS

This is a nonprovisional of U.S. provisional patent application 63/135,228 filed Jan. 8, 2021, incorporated by reference herein.

FIELD OF THE INVENTION

The present invention is related to a multipurpose ladder, which can be extended or retracted while either in the A mode or as a straight ladder, without having to be placed on the ground. (As used herein, references to the “present invention” or “invention” relate to exemplary embodiments and not necessarily to every embodiment encompassed by the appended claims.) More specifically, the present invention is related to a multipurpose ladder, which can be extended or retracted while either in the A mode or as a straight ladder, without having to be placed on the ground, by using pulleys and hoist ropes.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Presently, the extendable base sections of a multi-form ladder must be grasped directly to be moved to the desired extension position after individually unlocking the usual J-locks. Furthermore, as is often the case, the multi-form ladder is laid on the ground to facilitate reconfiguration of the multi-form ladder, which takes time to do, as well as effort. It is desirable to facilitate the reconfiguration of a multi-form ladder more efficiently and with less effort than is currently commonly required.

BRIEF SUMMARY OF THE INVENTION

The present invention pertains to a multipurpose ladder. The ladder comprises a first fly section having a first fly right rail, a first fly left rail in parallel and spaced relation with the first fly right rail and a plurality of first fly rungs attached to the first fly left rail and first fly right rail. The ladder comprises a first articulated hinge attached to the first fly right rail with a first set of fasteners. The ladder comprises a second articulated hinge attached to the first fly left rail with a second set of fasteners. The ladder comprises a second fly section having a second fly right rail, and a second fly left rail in parallel and spaced relation with the second fly right rail and a plurality of second fly rungs attached to the second fly left and right rails. The second fly right rail attached to the first articulated hinge and the second fly left rail attached to the second articulated hinge so the second fly section can rotate about the first and second articulated hinges at least 80° relative to the first fly section. The ladder comprises a first base section having a first base right rail, and a first base left rail in parallel and spaced relation with the first base right rail and a plurality of first base rungs attached to the first base left and right rails. The first base right rail adjacent the first fly right rail with the first fly right rail sliding up and down relative to the first base right rail. The ladder comprises a first pulley attached adjacent a top of the first base right rail. The ladder comprises a first anchor attached adjacent a bottom of the first fly right rail. The ladder comprises a first cable having a free end and a fixed end. The fixed end attached to the first anchor. The first cable extending from the first anchor about the first pulley and past the first pulley so the free end extends past the first pulley. When the free end is pulled, the first fly right rail is moved relative to the first base right rail by the first cable engaged with the first pulley and the fixed end attached to the first anchor. The ladder comprises a first locking assembly engaged with the first base section and first fly section which locks the first fly right rail in place relative to the first base right rail in a locked state and allows the first fly right rail to slide relative to the first base right rail in the unlocked state. The ladder comprises a second base section having a second base right rail, and a second base left rail in parallel and spaced relation with the second base right rail and a plurality of second base rungs attached to the second base left and right rails. The second base right rail adjacent the second fly right rail with the second fly right rail sliding up and down relative to the second base right rail.

The present invention pertains to a method for using a multipurpose ladder. The method comprises the steps of pulling on the free end of the first cable to raise the first fly section relative to the first base section. The ladder comprises a first fly section having a first fly right rail, a first fly left rail in parallel and spaced relation with the first fly right rail and a plurality of first fly rungs attached to the first fly left rail and first fly right rail. The ladder comprises a first articulated hinge attached to the first fly right rail with a first set of fasteners. The ladder comprises a second articulated hinge attached to the first fly left rail with a second set of fasteners. The ladder comprises a second fly section having a second fly right rail, and a second fly left rail in parallel and spaced relation with the second fly right rail and a plurality of second fly rungs attached to the second fly left and right rails. The second fly right rail attached to the first articulated hinge and the second fly left rail attached to the second articulated hinge so the second fly section can rotate about the first and second articulated hinges at least 80° relative to the first fly section. The ladder comprises a first base section having a first base right rail, and a first base left rail in parallel and spaced relation with the first base right rail and a plurality of first base rungs attached to the first base left and right rails. The first base right rail adjacent the first fly right rail with the first fly right rail sliding up and down relative to the first base right rail. The ladder comprises a first pulley attached adjacent a top of the first base right rail. The ladder comprises a first anchor attached adjacent a bottom of the first fly right rail. The ladder comprises a first cable having a free end and a fixed end. The fixed end attached to the first anchor. The first cable extending from the first anchor about the first pulley and past the first pulley so the free end extends past the first pulley. When the free end is pulled, the first fly right rail is moved relative to the first base right rail by the first cable engaged with the first pulley and the fixed end attached to the first anchor. The ladder comprises a first locking assembly engaged with the first base section and first fly section which locks the first fly right rail in place relative to the first base right rail in a locked state and allows the first fly right rail to slide relative to the first base right rail in the unlocked state. The ladder comprises a second base section having a second base right rail, and a second base left rail in parallel and spaced relation with the second base right rail and a plurality of second base rungs attached to the second base left and right rails. The second base right rail adjacent the second fly right rail with the second fly right rail sliding up and down relative to the second base right rail. There is the step of pulling on the free end of the first cable to raise the first fly section relative to the first base section.

The present invention pertains to a method for producing a multipurpose ladder. The method comprises the steps of attaching a first pulley to a first base right rail of a first base section. There is the step of attaching a second pulley to a second base right rail of a second base section. There is the step of attaching a third pulley to a second fly right rail of a second fly section. The second fly right rail attached by a first articulated hinge to a first fly right rail of a first fly section so the second fly right rail can rotate relative to the first fly right rail. The first base section disposed adjacent and alongside the first fly section and the second base section disposed adjacent and alongside the second fly section. There is the step of attaching a first anchor to the first fly right rail. There is the step of attaching a second anchor to either the first articulated hinge or the second fly right rail or the second base right rail. There is the step of extending a first cable from the first anchor to and about the first pulley. There is the step of extending a second cable from the second anchor to and about the third pulley and two and about the second pulley.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 1:
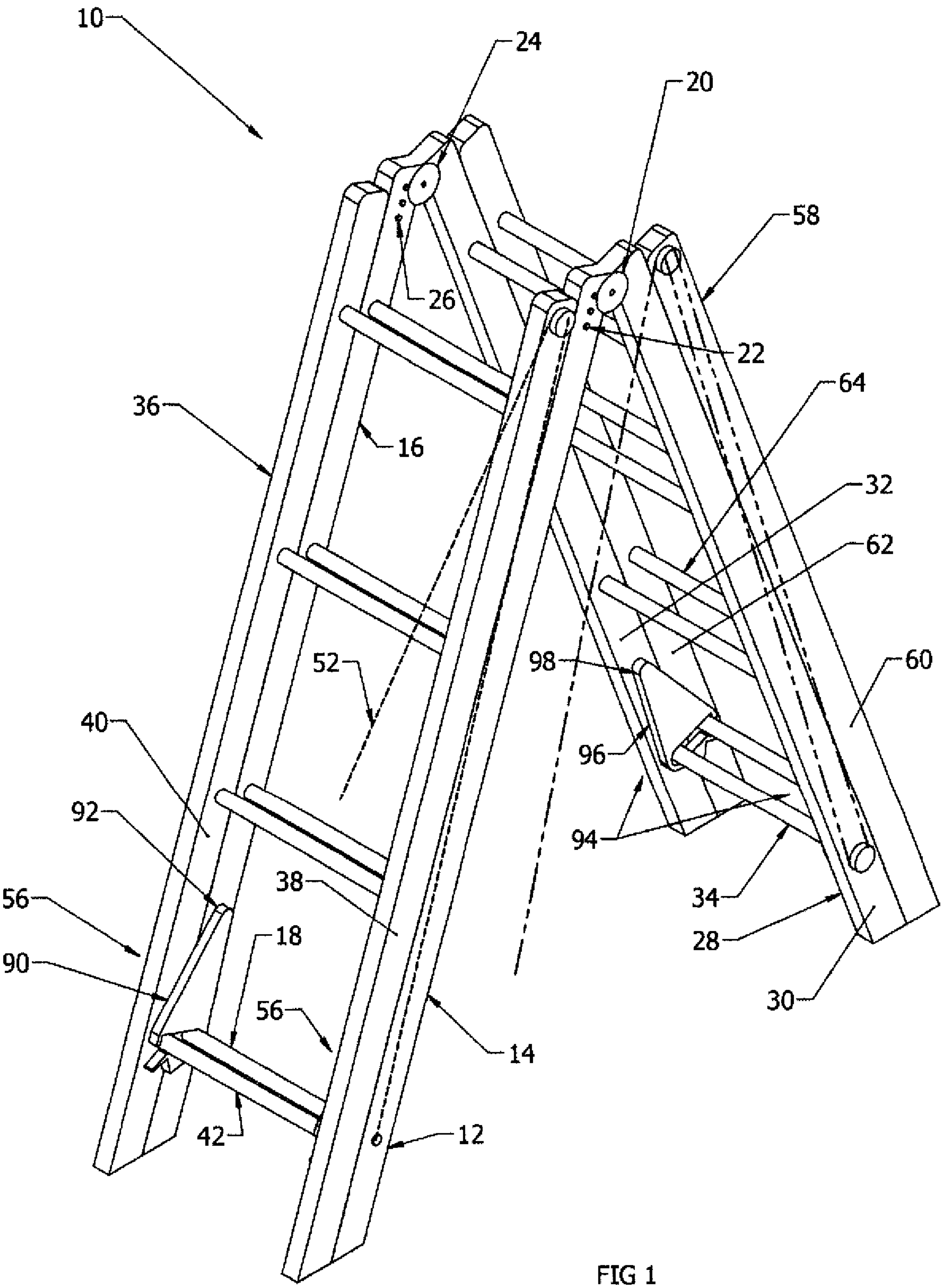
FIG. 1 is a perspective view of a simplified MT type ladder set up in A mode.
Figure 2:
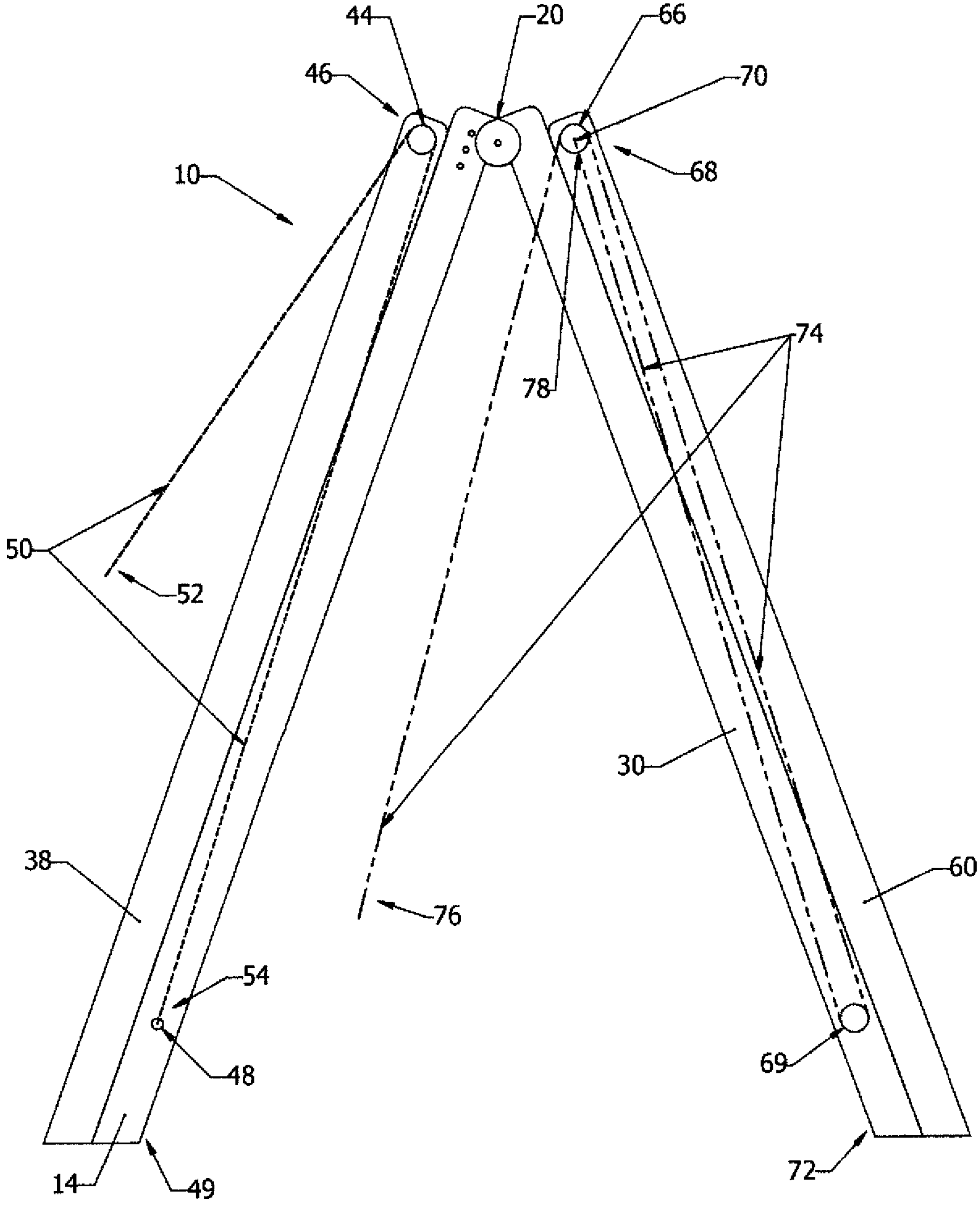
FIG. 2 is a side view of the MT ladder showing the components of this invention.

Referring now to the drawings wherein like reference numerals refer to similar or identical parts throughout the several views, and more specifically to FIGS. 1 and 2 thereof, there is shown a multipurpose ladder 10. The ladder 10 comprises a first fly section 12 having a first fly right rail 14, a first fly left rail 16 in parallel and spaced relation with the first fly right rail 14 and a plurality of first fly rungs 18 attached to the first fly left rail 16 and first fly right rail 14. The ladder 10 comprises a first articulated hinge 20 attached to the first fly right rail 14 with a first set of fasteners 22. The ladder 10 comprises a second articulated hinge 24 attached to the first fly left rail 16 with a second set of fasteners 26. The ladder 10 comprises a second fly section 28 having a second fly right rail 30, and a second fly left rail 32 in parallel and spaced relation with the second fly right rail 30 and a plurality of second fly rungs 34 attached to the second fly left and right rails. The second fly right rail 30 attached to the first articulated hinge 20 and the second fly left rail 32 attached to the second articulated hinge 24 so the second fly section 28 can rotate about the first and second articulated hinges 20, 24 at least 80° relative to the first fly section 12. The ladder 10 comprises a first base section 36 having a first base right rail 38, and a first base left rail 40 in parallel and spaced relation with the first base right rail 38 and a plurality of first base rungs 42 attached to the first base left and right rails. The first base right rail 38 adjacent the first fly right rail 14 with the first fly right rail 14 sliding up and down relative to the first base right rail 38. The ladder 10 comprises a first pulley 44 attached adjacent a top 46 of the first base right rail 38. The ladder 10 comprises a first anchor 48 attached adjacent a bottom 49 of the first fly right rail 14. The ladder 10 comprises a first cable 50 having a free end 52 and a fixed end 54. The fixed end 54 attached to the first anchor 48. The first cable 50 extending from the first anchor 48 about the first pulley 44 and past the first pulley 44 so the free end 52 extends past the first pulley 44. When the free end 52 is pulled, the first fly right rail 14 is moved relative to the first base right rail 38 by the first cable 50 engaged with the first pulley 44 and the fixed end 54 attached to the first anchor 48. The ladder 10 comprises a first locking assembly 56 engaged with the first base section 36 and first fly section 12 which locks the first fly right rail 14 in place relative to the first base right rail 38 in a locked state and allows the first fly right rail 14 to slide relative to the first base right rail 38 in the unlocked state. The ladder 10 comprises a second base section 58 having a second base right rail 60, and a second base left rail 62 in parallel and spaced relation with the second base right rail 60 and a plurality of second base rungs 64 attached to the second base left and right rails. The second base right rail 60 adjacent the second fly right rail 30 with the second fly right rail 30 sliding up and down relative to the second base right rail 60.

The ladder 10 may include a second pulley 66 attached adjacent a top 68 of the second base right rail 60; a second anchor 70 attached adjacent the top 68 of the second base right rail 60 or a top of the second fly right rail 30 or the first articulated hinge 20; and a second cable 74 having a free end 76 and a fixed end 78. The fixed end 78 of the second cable 74 attached to the second anchor 70. The second cable 74 extending from the second anchor 70 about the second pulley 66 and past the second pulley 66 so the free end 76 extends past the second pulley 66. When the free end 76 of the second cable 74 is pulled, the second fly right rail 30 is moved relative to the second base right rail 60 by the second cable 74 engaged with the second pulley 66 and the fixed end 78 of the second cable 74 attached to the second anchor 70. The ladder 10 may including a third pulley 69 attached adjacent a bottom 72 of the second fly right rail 30. The second cable 74 extending from the second anchor 70 about the third pulley 69 and around and past the second pulley 66 so the free end 76 extends past the second pulley 66. When the free end 76 of the second cable 74 is pulled, the second fly right rail 30 is moved relative to the second base right rail 60 by the second cable 74 engaged with the second pulley 66 and the third pulley 69 and the fixed end 78 of the second cable 74 attached to the second anchor 70.

The first base right rail 38 may be disposed about the first fly right rail 14 with the first fly right rail 14 sliding up and down relative to the first base right rail 38, and the second right base rail 60 is disposed about the second fly right rail 30 with the second fly right rail 30 sliding up and down relative to the second base right rail 60. When the ladder 10 is in the A mode, preferably the first base section 36 is disposed adjacent and outside the first fly section 12, and the second base section 58 is disposed adjacent and outside the second fly section 28 so that the first and second fly sections are disposed between the first base section and the second base section.

The first locking assembly 56 may be a first extendable section lock assembly. The first extendable section lock assembly permits the user to move the first fly section 12 indirectly and remotely relative to the first base section 36. The first extendable section lock assembly may include a first fly lock portion attached to the first fly section 12 of the ladder 10 which locks with the first base section 36 of the ladder 10, and which unlocks from the first base section 36 simply by the first fly section 12 being lifted relative to the first base section 36.

The ladder 10 may comprise a second locking assembly engaged with the second base section 58 and second fly section 28 which locks the second fly right rail 30 in place relative to the second base right rail 60 in a locked state and allows the second fly right rail 30 to slide relative to the second base right rail 60 in the unlocked state. The second locking assembly may be a second extendable section lock assembly. The second extendable section lock assembly permits the user to move the second fly section 28 indirectly and remotely relative to the second base section 58. The second extendable section lock assembly may include a second fly lock portion attached to the second fly section 28 of the ladder 10 which locks with the second base section 58 of the ladder 10, and which unlocks from the second base section 58 simply by the second fly section 28 being lifted relative to the second base section 58.

The present invention pertains to a method for using a multipurpose ladder 10. The method comprises the steps of pulling on the free end 52 of the first cable 50 to raise the first fly section 12 relative to the first base section 36. The ladder 10 comprises a first fly section 12 having a first fly right rail 14, a first fly left rail 16 in parallel and spaced relation with the first fly right rail 14 and a plurality of first fly rungs 18 attached to the first fly left rail 16 and first fly right rail 14. The ladder 10 comprises a first articulated hinge 20 attached to the first fly right rail 14 with a first set of fasteners 22. The ladder 10 comprises a second articulated hinge 24 attached to the first fly left rail 16 with a second set of fasteners 26. The ladder 10 comprises a second fly section 28 having a second fly right rail 30, and a second fly left rail 32 in parallel and spaced relation with the second fly right rail 30 and a plurality of second fly rungs 34 attached to the second fly left and right rails. The second fly right rail 30 attached to the first articulated hinge 20 and the second fly left rail 32 attached to the second articulated hinge 24 so the second fly section 28 can rotate about the first and second articulated hinges 20, 24 at least 80° relative to the first fly section 12. The ladder 10 comprises a first base section 36 having a first base right rail 38, and a first base left rail 40 in parallel and spaced relation with the first base right rail 38 and a plurality of first base rungs 42 attached to the first base left and right rails. The first base right rail 38 adjacent the first fly right rail 14 with the first fly right rail 14 sliding up and down relative to the first base right rail 38. The ladder 10 comprises a first pulley 44 attached adjacent a top 46 of the first base right rail 38. The ladder 10 comprises a first anchor 48 attached adjacent a bottom 49 of the first fly right rail 14. The ladder 10 comprises a first cable 50 having a free end 52 and a fixed end 54. The fixed end 54 attached to the first anchor 48. The first cable 50 extending from the first anchor 48 about the first pulley 44 and past the first pulley 44 so the free end 52 extends past the first pulley 44. When the free end 52 is pulled, the first fly right rail 14 is moved relative to the first base right rail 38 by the first cable 50 engaged with the first pulley 44 and the fixed end 54 attached to the first anchor 48. The ladder 10 comprises a first locking assembly 56 engaged with the first base section 36 and first fly section 12 which locks the first fly right rail 14 in place relative to the first base right rail 38 in a locked state and allows the first fly right rail 14 to slide relative to the first base right rail 38 in the unlocked state. The ladder 10 comprises a second base section 58 having a second base right rail 60, and a second base left rail 62 in parallel and spaced relation with the second base right rail 60 and a plurality of second base rungs 64 attached to the second base left and right rails. The second base right rail 60 adjacent the second fly right rail 30 with the second fly right rail 30 sliding up and down relative to the second base right rail 60. There is the step of pulling on the free end 52 of the first cable 50 to raise the first fly section 12 relative to the first base section 36.

The present invention pertains to a method for producing a multipurpose ladder 10. The method comprises the steps of attaching a first pulley 44 to a first base right rail 38 of a first base section 36. There is the step of attaching a second pulley 66 to a second base right rail 60 of a second base section 58. There is the step of attaching a third pulley 69 to a second fly right rail 30 of a second fly section 38. The second fly right rail 30 attached by a first articulated hinge 20 to a first fly right rail 14 of a first fly section 12 so the second fly right rail 30 can rotate relative to the first fly right rail 14. The first base section 36 disposed adjacent and alongside the first fly section 12 and the second base section 58 disposed adjacent and alongside the second fly section 38. There is the step of attaching a first anchor 48 to the first fly right rail 14. There is the step of attaching a second anchor 74 to either the first articulated hinge 20 or the second fly right rail 30 or the second base right rail 60. There is the step of extending a first cable 50 from the first anchor 48 to and about the first pulley 44. There is the step of extending a second cable 74 from the second anchor 66 to and about the third pulley 69 and to and about the second pulley 66.

This invention provides for the control of the extension and retraction of the base sections relative to the fly sections of a multi-form ladder of the MT type when used with the Extendable Section Lock described in U.S. patent application Ser. No. 63/058,805, incorporated by reference herein. (The Extendable Section Locks function like conventional ladder locks used on extension ladders.)

In order to adjust the extension of the base sections of an MT type ladder whether in A ladder mode or straight ladder mode, often the user must lay the ladder down on the ground to make the adjustments. After making the adjustments and the ladder is put into its in-use position, any further adjustments require that the ladder again be laid down. With this invention the ladder may be set up, in A mode or as a straight ladder, and extension adjustments are made easily by the user while standing on the ground and the ladder is in either of these modes, without having to be laid down again. Ease and convenience of adjustment are advantages of this invention.

FIG. 1 is a perspective view of a simplified MT type ladder set up in A mode. Fly and base sections and hinges are typical MT components. The base sections are shown fully retracted. No locks are shown between the fly and base sections. It is assumed that Extendable Section Locks (previously described) are in use.

FIG. 2 is a side view of the MT ladder 10 showing the components of this invention. A first cable 50 is attached to the lower end of the first fly section 12. This first cable 50 passes over a first pulley 44 mounted on the upper end of the first base section 36. The free end 52 of this first cable 50 extends downward to be within easy reach of a user standing on the ground. A second cable 74 is attached to the upper end of the second base section 58. The attachment point is the stationary axle 86 of a second pulley 66 which is mounted on the upper end of the second base section 58. The second cable 74 extends downward and passes around a third pulley 69 mounted on the lower end of the second fly section 28. From there the second cable 74 extends upward and passes around the second pulley 66 at the upper end of the second base section 58. The free end 76 of the second cable 74 extends downward to be within easy reach of a user standing on the ground. These pulleys, cables, and anchors are shown on the right side of the ladder 10. They could be positioned on the left side, or one on the right and the other on the left. They could also be positioned between the ladder rungs with the anchors and pulleys being mounted to rungs rather than rails. The free ends 52, 76 of the cables 50, 74 may have stops, such as a ball attached to each free end 52, 76 which prevents each free end 52, 76 from possibly being pulled out from the pulley 44, 66 through which it extends.

Figure 3:
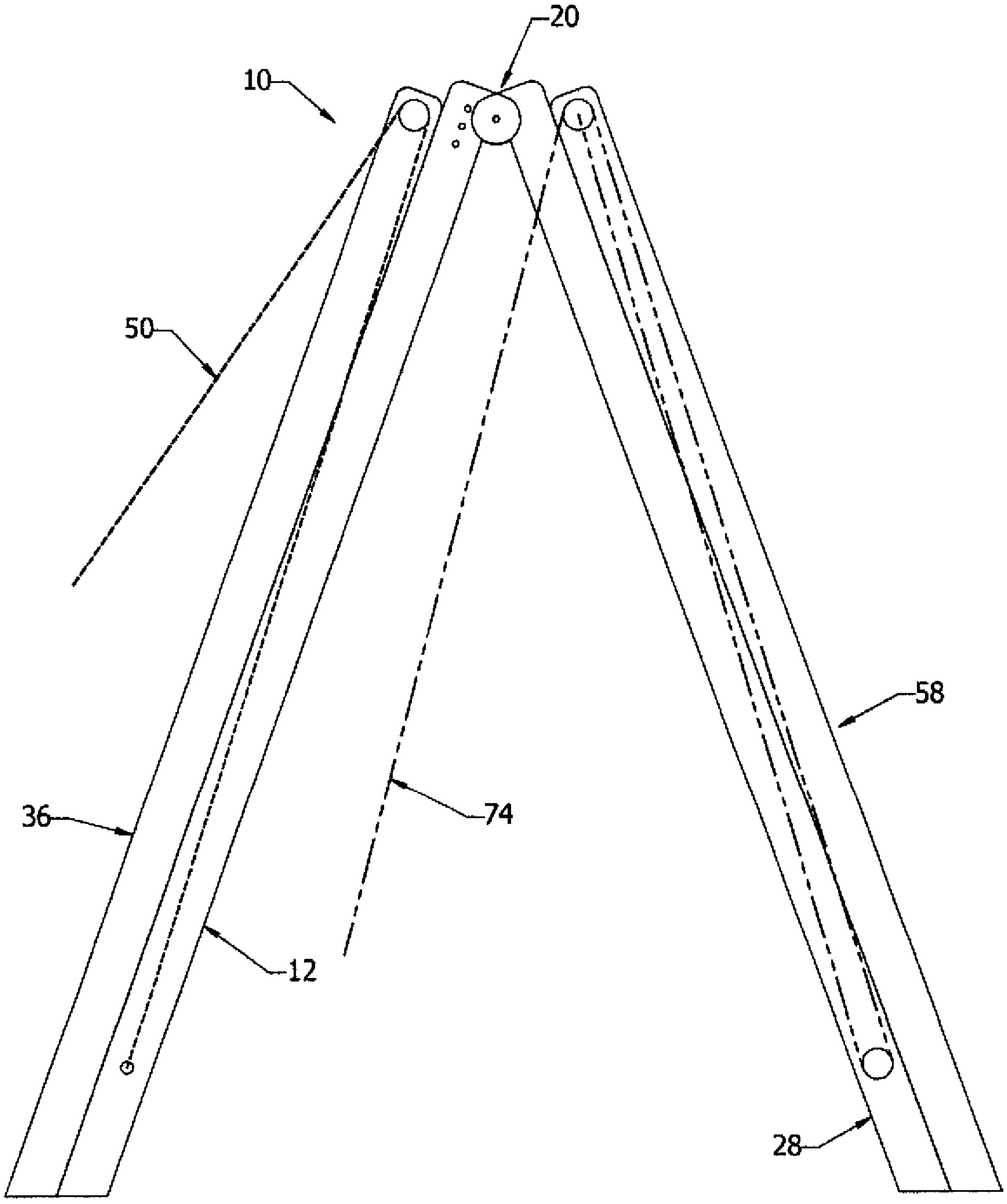
FIG. 3 is the same view as FIG. 2.

FIG. 3 is the same view as FIG. 2.

Figure 4:
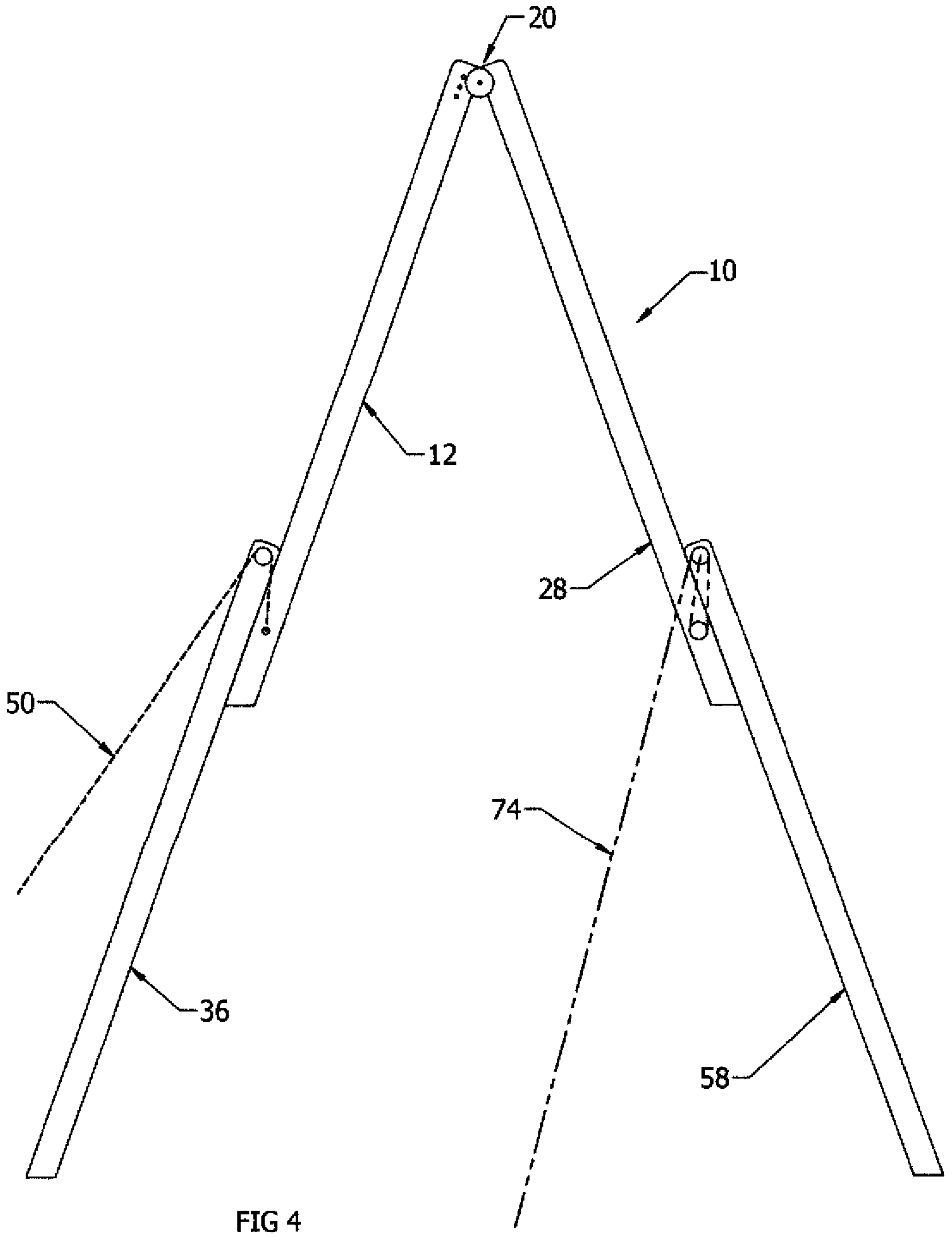
FIG. 4 shows both the front fly section and rear fly section having been extended by the user pulling downward on the front hoist rope and the rear hoist rope.

FIG. 4 shows both the first fly section 12 and second fly section 28 having been extended by the user pulling downward on the first cable 50 and the second cable 74. The cables 50, 74 may be pulled simultaneously or one after the other. The first and second sections are shown fully extended but may be extended in any increment of 12" which is typical for these ladders.

Figure 5:
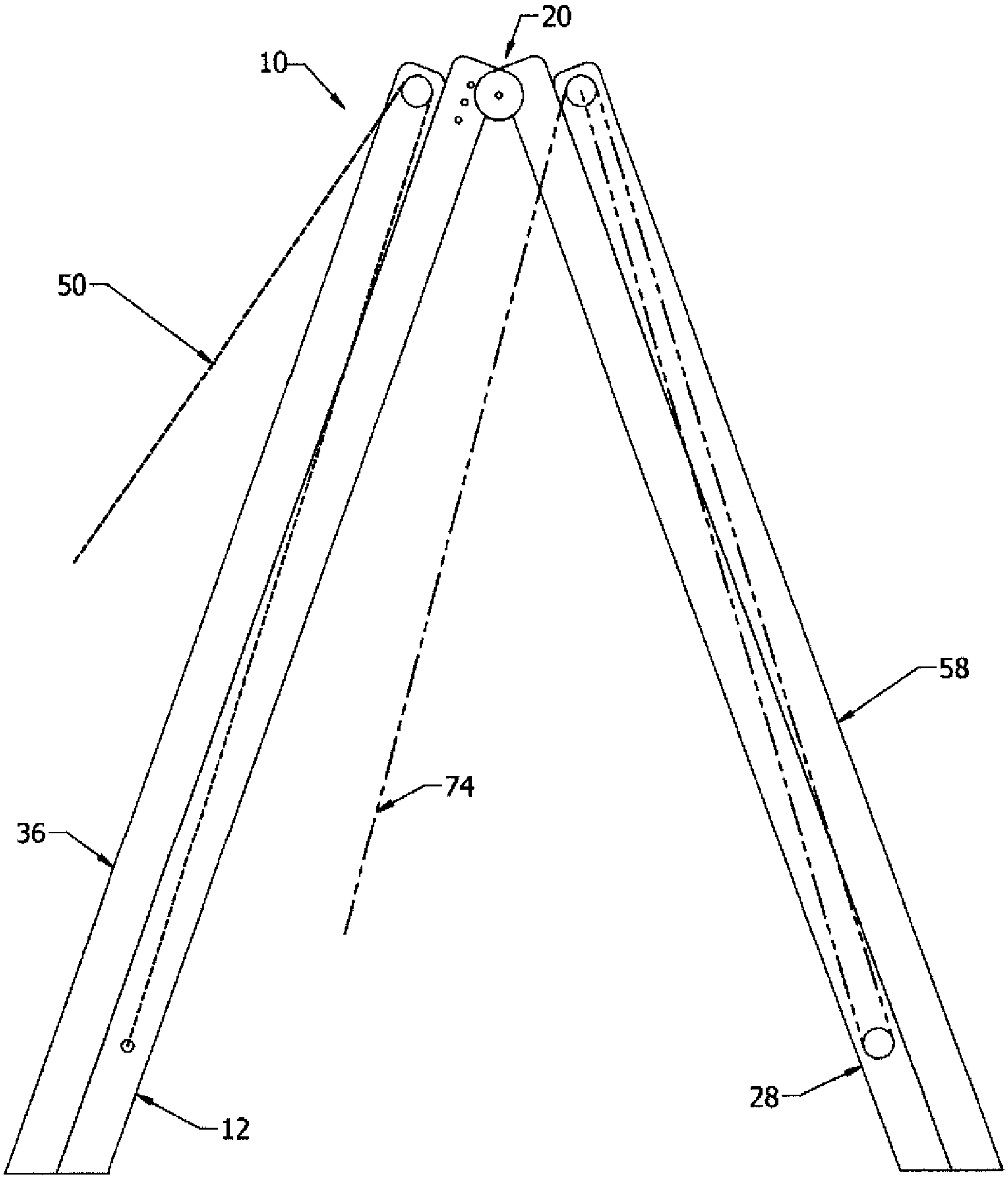
FIG. 5 is the same view as FIG. 2.

FIG. 5 is the same view as FIG. 2.

Figure 6:
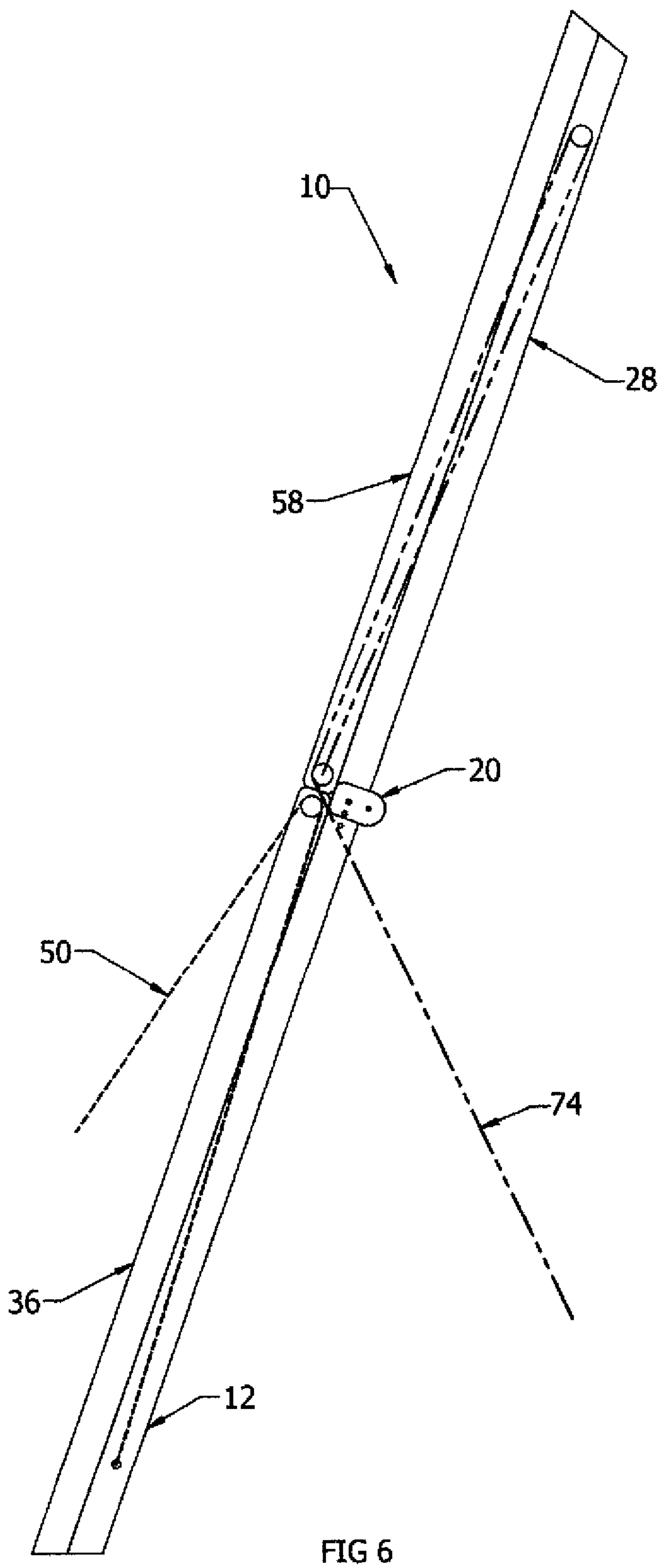
FIG. 6 shows the ladder having been put into straight mode.

FIG. 6 shows the ladder 10 having been put into straight mode. Typically, the ladder's uppermost end would be leaning against a wall, edge of a roof, etc. The ladder sections are fully retracted, FIG. 7 shows the ladder 10 after the user has pulled downward on the second cable 74 and has thus extended the second base section 58.

Figure 7:
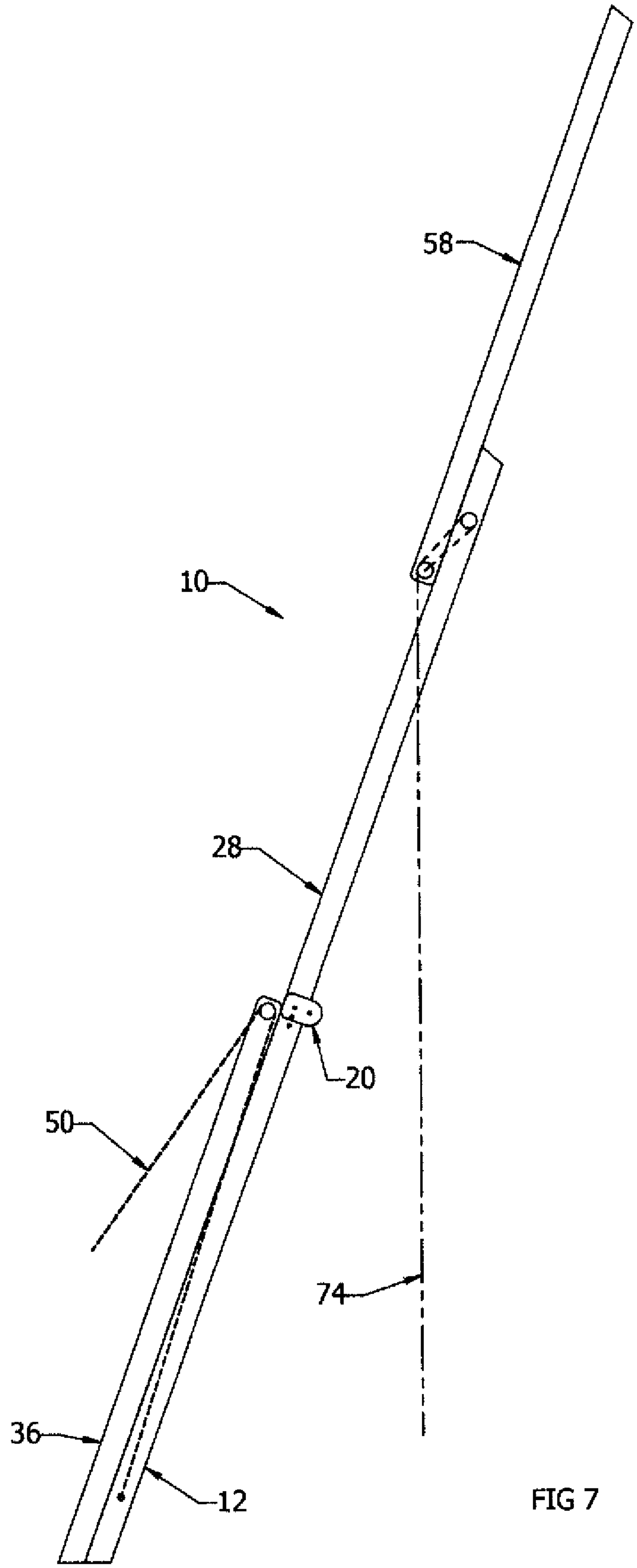
FIG. 7 shows the ladder after the user has pulled downward on the rear hoist rope and has thus extended the rear base section.
Figure 8:
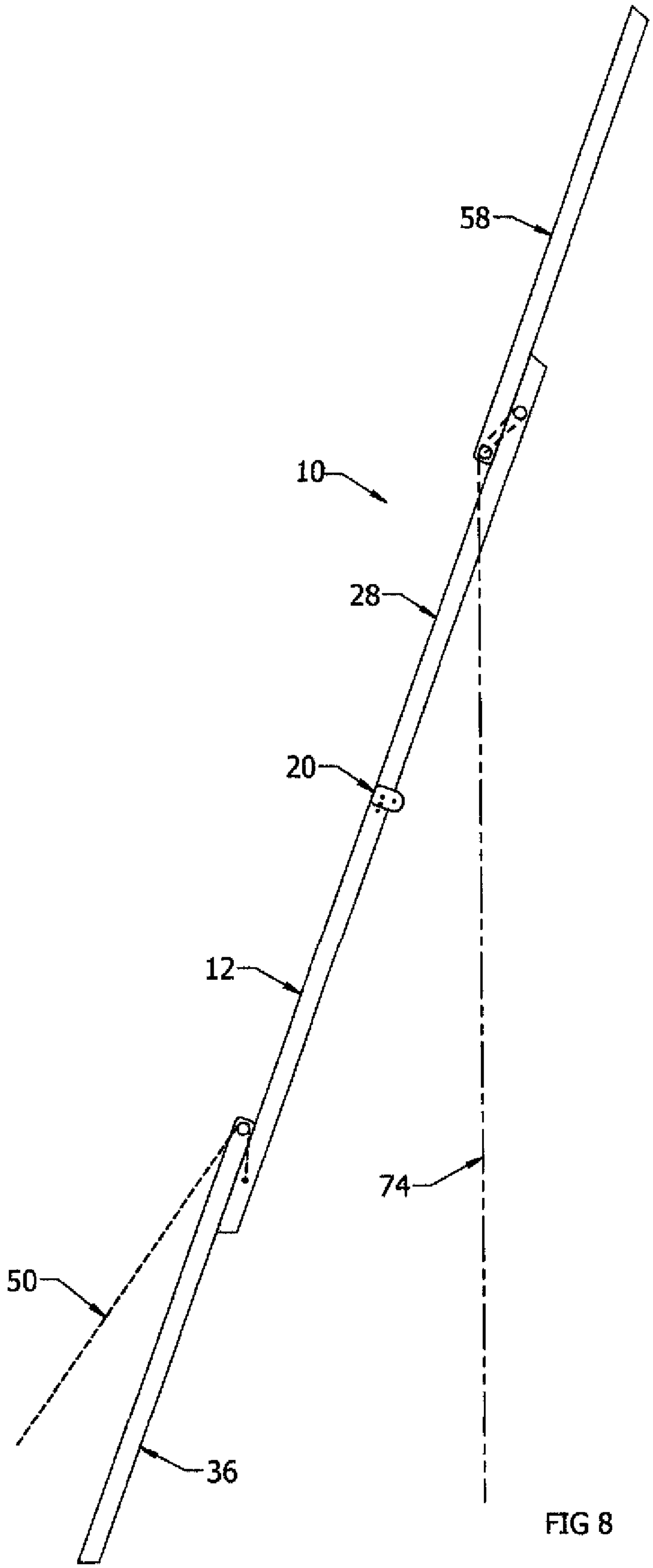
FIG. 8 shows the ladder of FIG. 7 after the user has pulled downward on the front hoist rope and thus extended the rear fly, rear base, and front fly sections as a unit relative to the front base section.

FIG. 8 shows the ladder 10 of FIG. 7 after the user has pulled downward on the first cable 50 and thus extended the second fly, second base, and first fly sections as a unit relative to the first base section 36.

Figure 9:
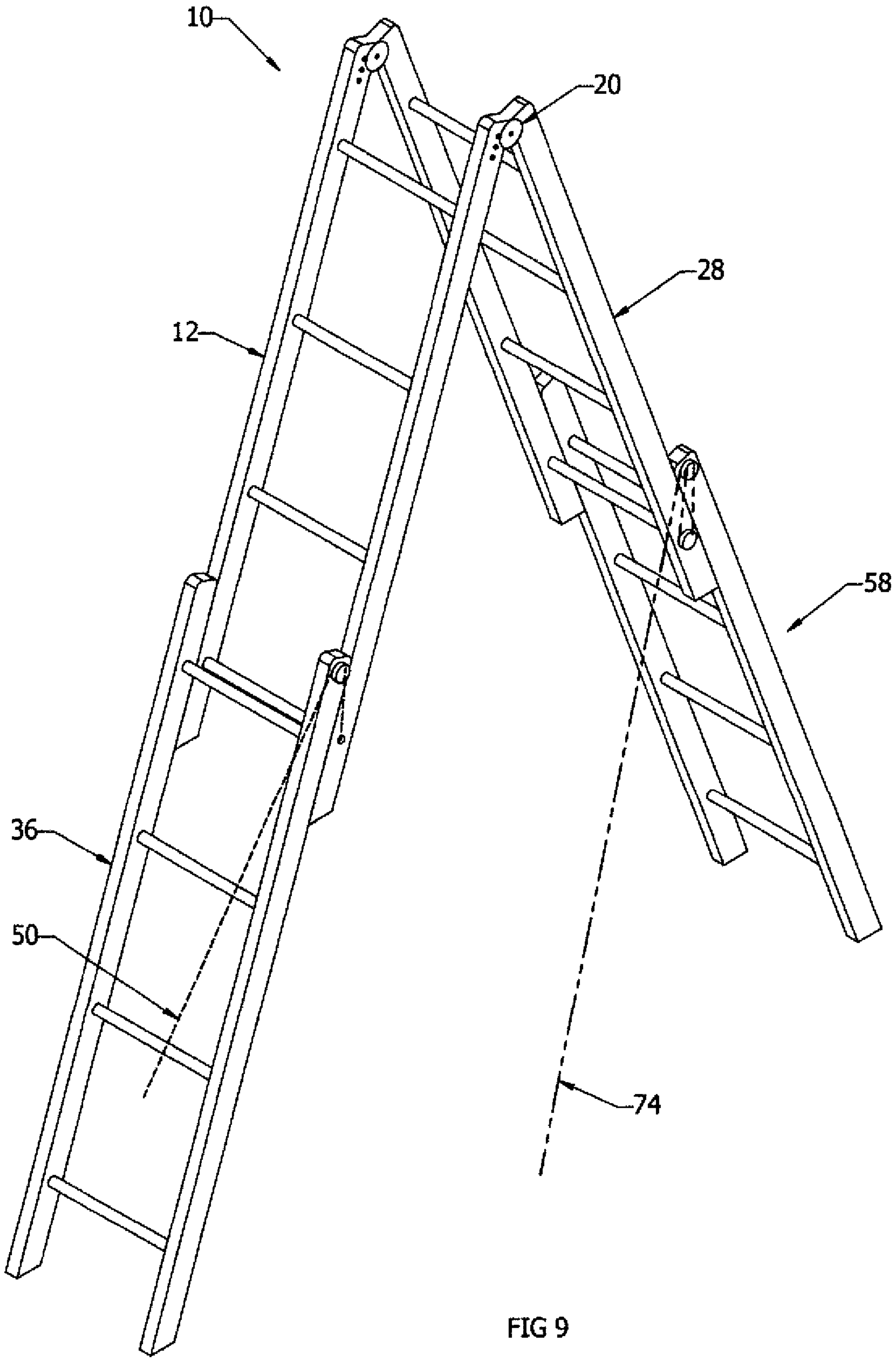
FIGS. 9 and 10 are perspective views of FIGS. 4 and 8.
Figure 10:
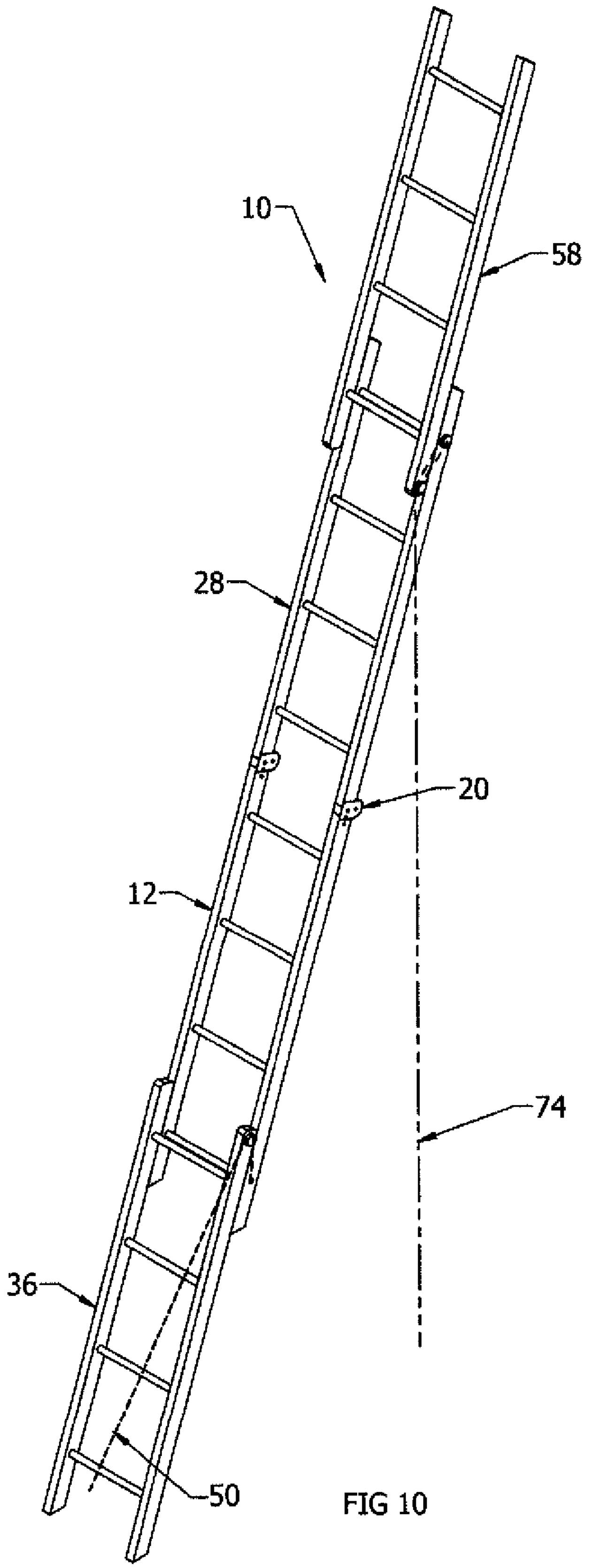

FIGS. 9 and 10 are perspective views of FIGS. 4 and 8.

In keeping with the functioning of the Extendable Section Locks, the sections of the ladder 10 can also be retracted by the user using the first and second cables 50, 74 from the ground with the ladder 10 in its in-use position.

Figure 11:
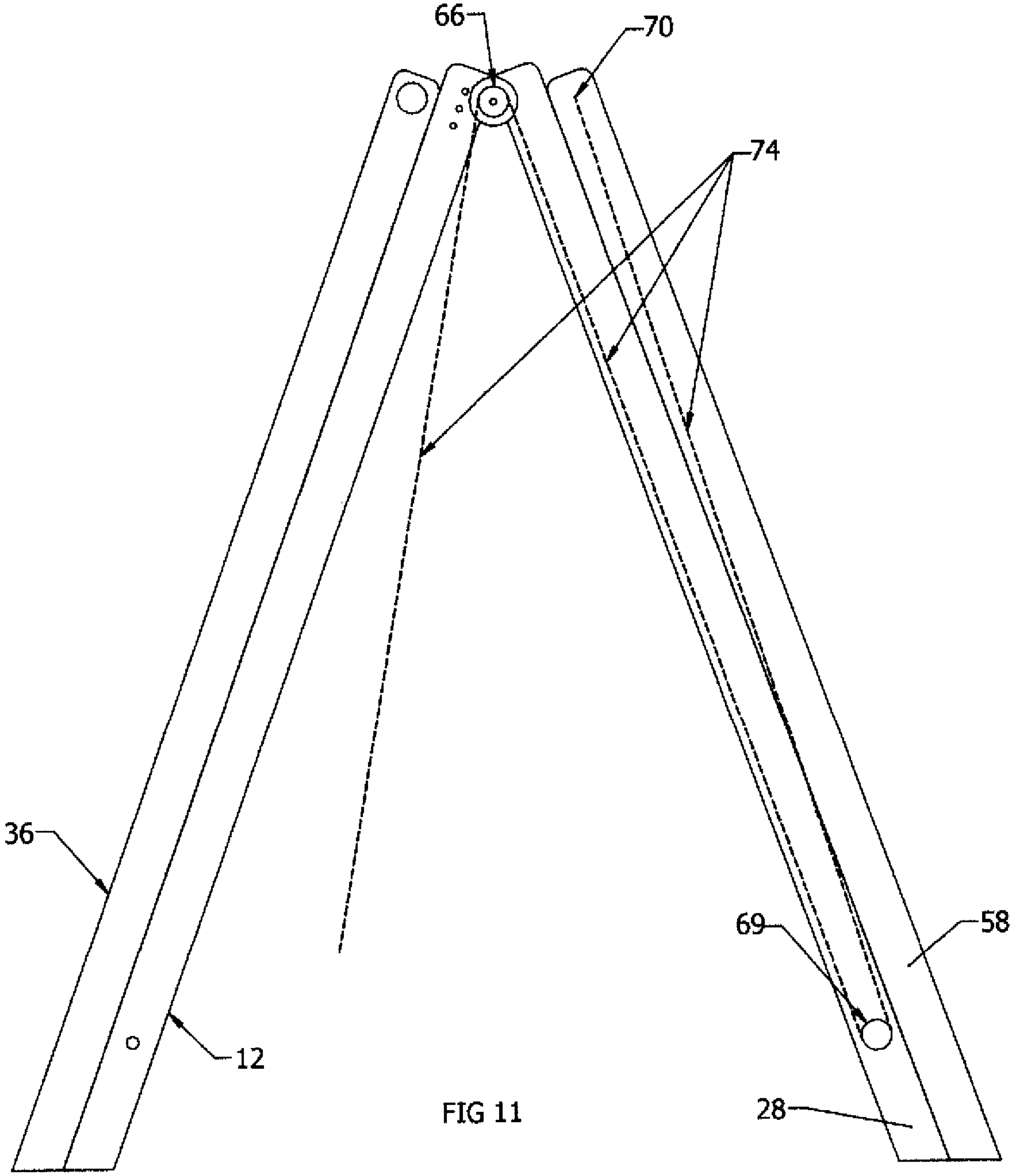
FIG. 11 shows the ladder in A mode.

FIG. 11 shows the ladder 10 in A mode. (The first cable 50 is not shown in FIGS. 11, 12, 13, 14, 15 and 16, but if there is a first cable 50 on a particular ladder 10, it would be as seen in FIGS. 1, 2, 3, 4, etc.). The second cable 74 is attached to the upper end of the second base section 58, passes around the third pulley 69 on the lower end of the second fly section 28, and then passes over the second pulley 66 near the first hinge 20 of the ladder 10. When in A mode, pulling down on the free end 76 of the second cable 74 will not cause the second base section 58 to extend unless the user were to tip the ladder 10 forward so that the rear feet come off the ground.

Figure 12:
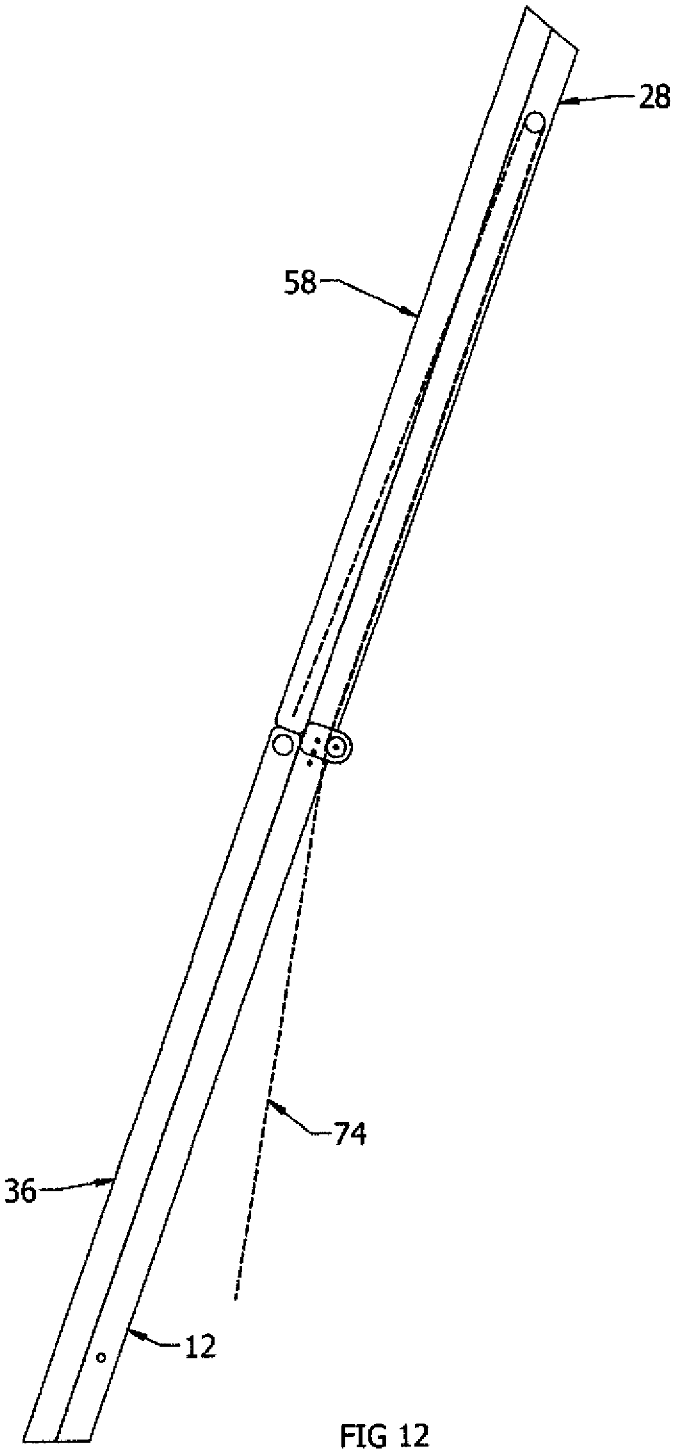
FIG. 12 shows the ladder in straight mode but with the rear outer section still retracted.

FIG. 12 shows the ladder 10 in straight mode but with the second base section 58 still retracted. Pulling down on the second cable 74 will cause the second base section 58 to extend.

Figure 13:
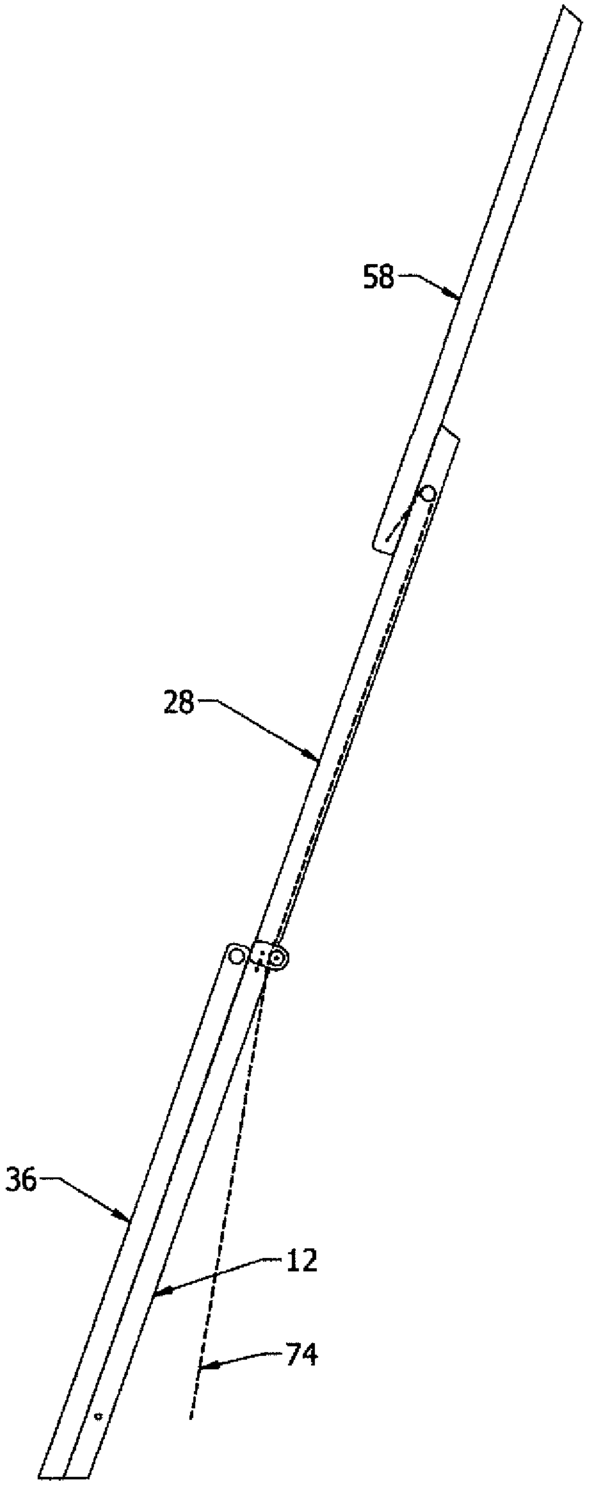
FIG. 13 shows the straight ladder with the rear outer section having been extended.

FIG. 13 shows the straight ladder 10 with the second base section 58 having been extended.

Figure 14:
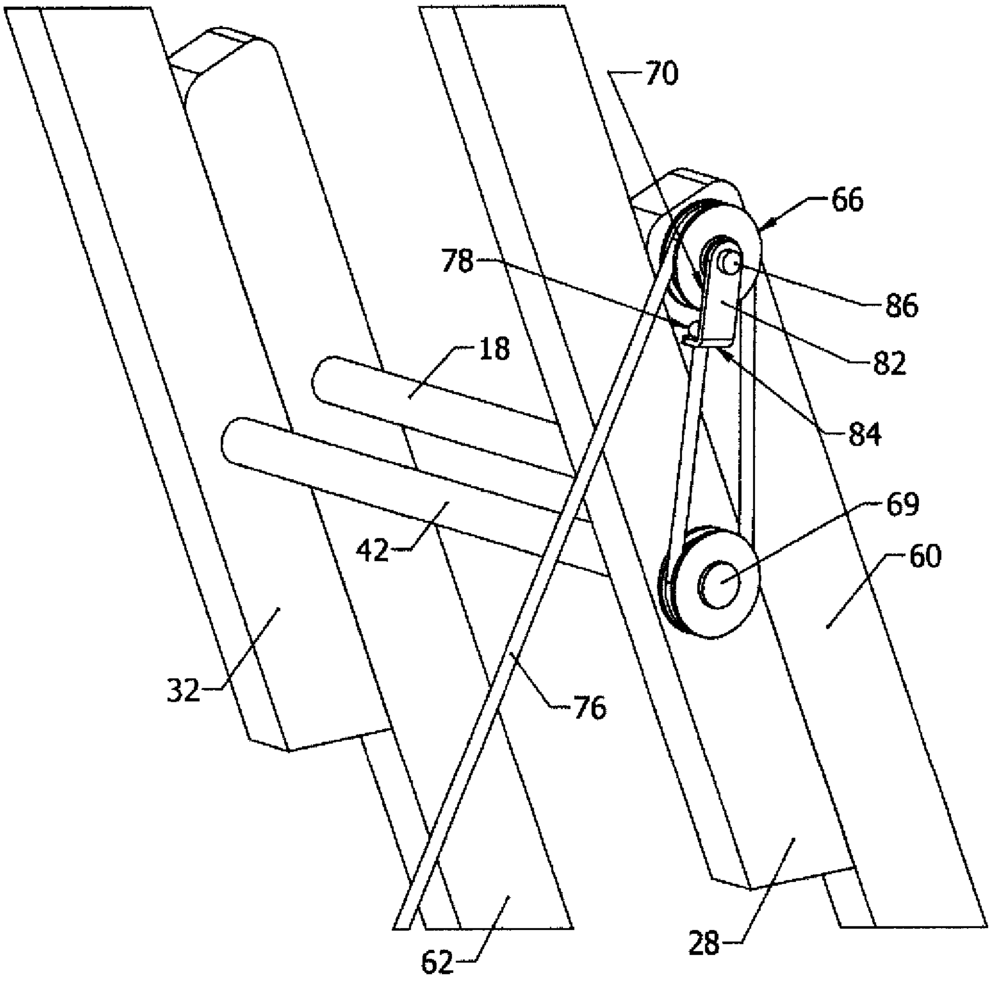
FIG. 14 shows the second anchor attached to the second pulley, preferably at the center of the second pulley.
Figure 15:
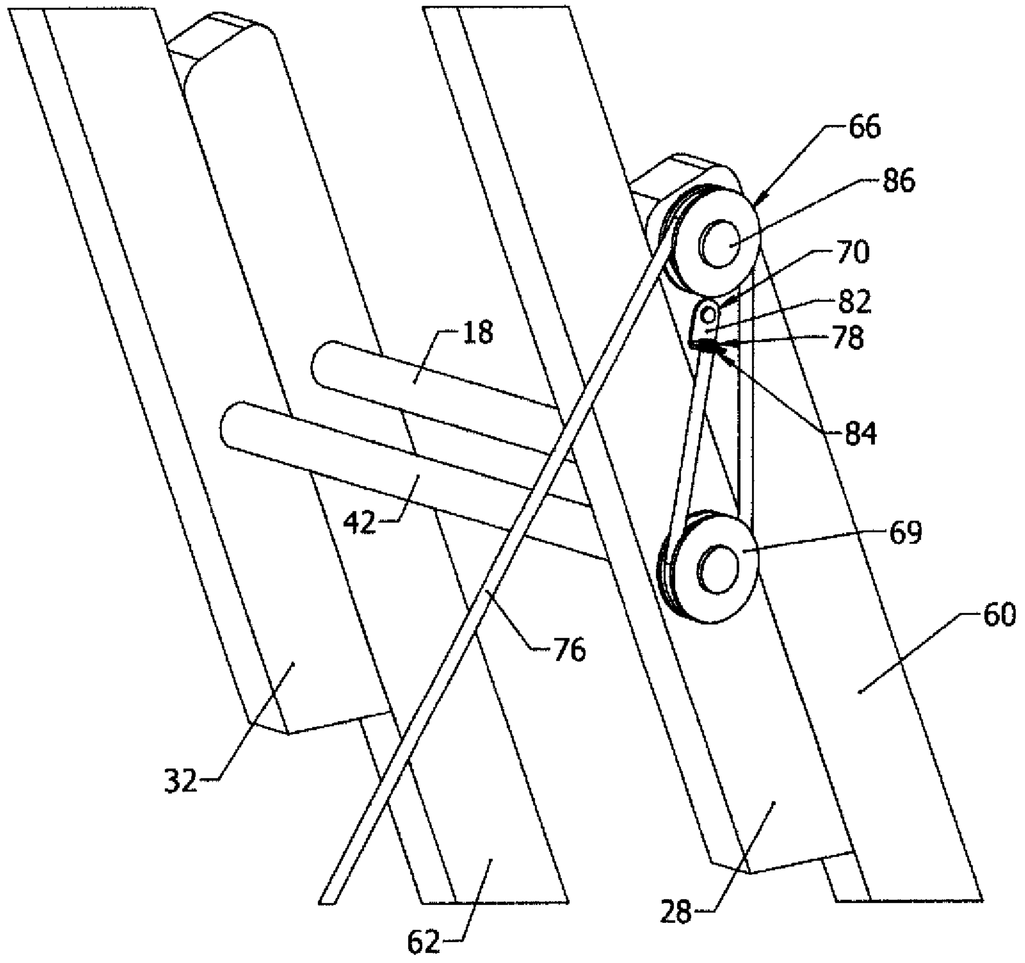
FIG. 15 shows the second anchor attached alternatively to the second base right rear rail below and adjacent to the second pulley.

FIG. 14 shows the second anchor 70 attached to the second pulley 66, preferably at the axle 86 of the second pulley 66. FIG. 15 shows the second anchor 70 attached alternatively to the second base right rear rail 60 below and adjacent to the second pulley 66. FIGS. 14 and 15 are closeup views in regard to FIG. 4. The second anchor 70 has a flat portion 82 through which a bolt or rivet extends to attach the second anchor 70 to the second pulley 66 or the second base right rear rail 60. The second anchor 70 has a lip 84 which extends essentially perpendicularly from the flat portion 82. The second cable 74 is attached to the lip 84. The first anchor 48 is the same as the second anchor 70, and the first cable 50 attaches to the lip 84 of the first anchor 48.

Figure 16:
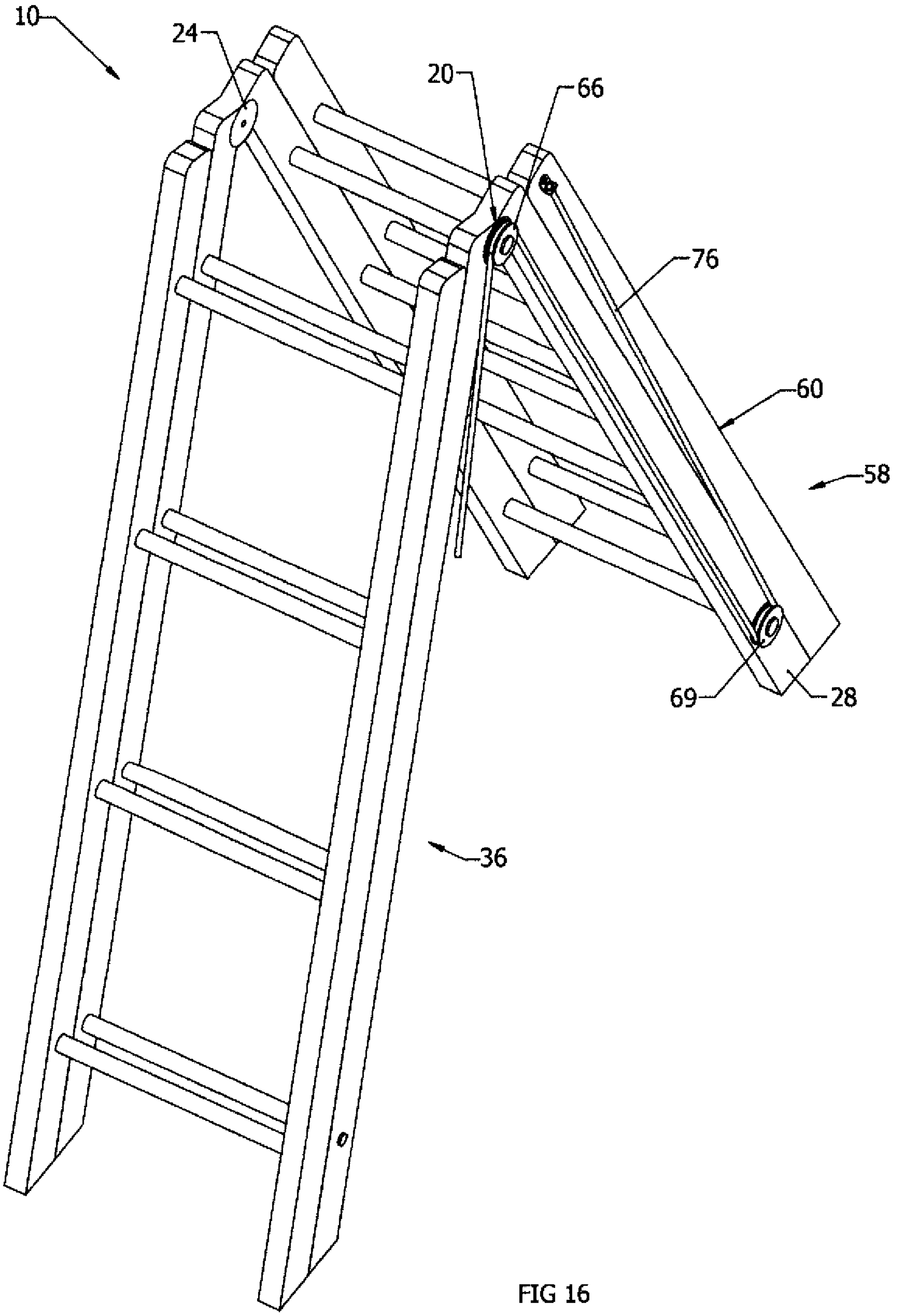
FIG. 16 is a more detailed view of FIG. 11, showing the second pulley attached to the first articulated hinge.
Figure 17:
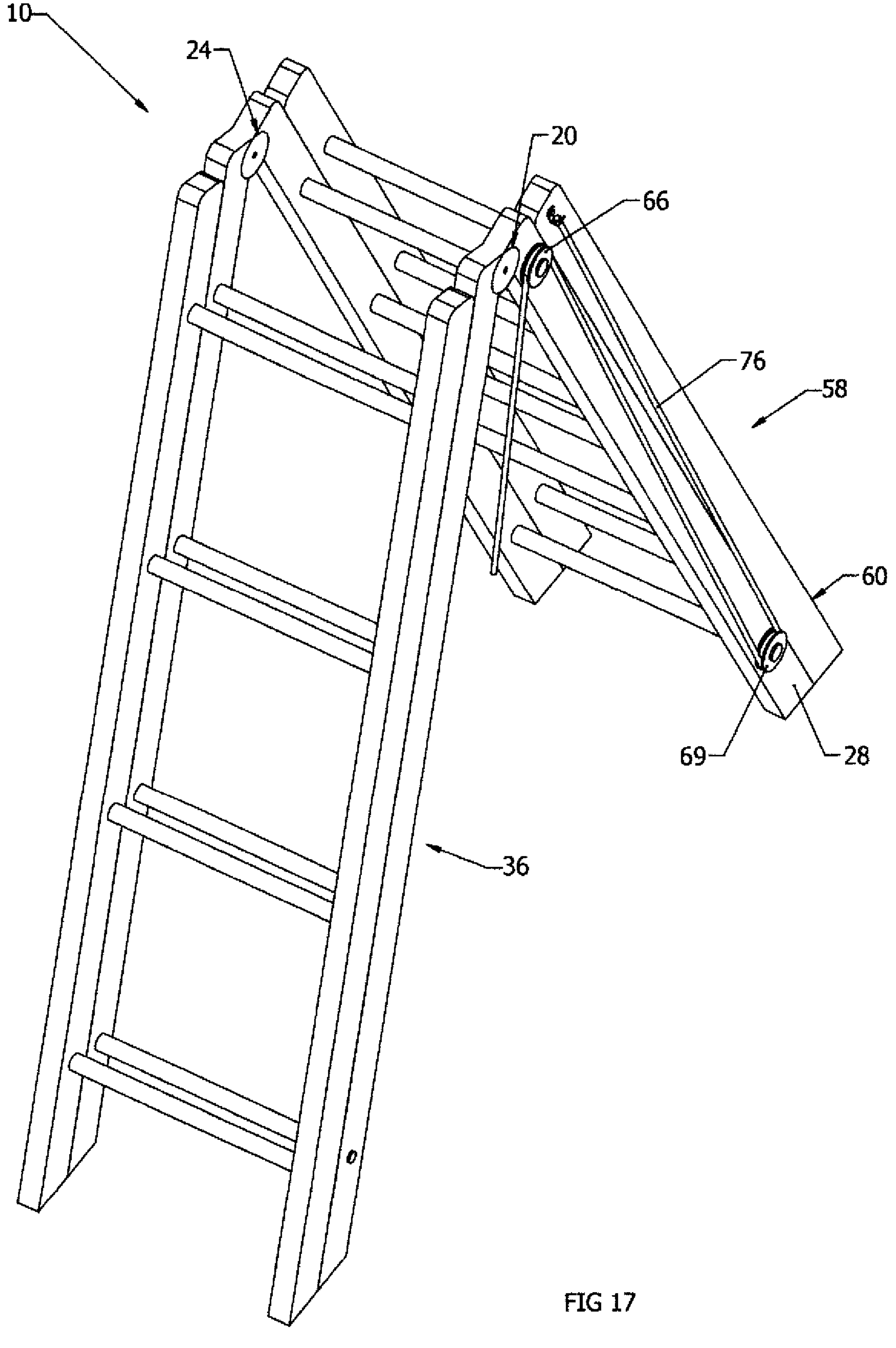
FIG. 17 is a more detailed view of FIG. 11, showing the second pulley attached to the second fly right rail.

FIG. 16 is a more detailed view of FIG. 11, showing the second pulley 66 attached to the first articulated hinge 20. In this embodiment, the pin 86 of the second pulley 66 is extended in length to just over the width of the second pulley 66, so the second pulley 66 can fit onto and be attached to the axle 86. FIG. 17 is a more detailed view of FIG. 11, showing the second pulley 66 attached to the second fly right rail 30.

Three ways of routing a cable through a pulley are as follows.

The first way of routing is used only on the first ladder sections. When pulled down, the first cable 50 will extend the first fly section 12 relative to the first base section 36, in A mode or straight mode. The first way has the first cable 50, first pulley 44, and first anchor 48 arranged, as shown in FIG. 2. This first way of routing works well when the first base section 36 is touching the ground and the first fly section 12 is to be raised. That is, pulling downward on the first cable 50 causes the first fly section 12 to rise. That same first way arrangement of first cable 50, first pulley 44 and first anchor 48 could be used on the second fly section 28 but will work only if the ladder 10 is in A-mode. If the ladder 10 were in straight mode (FIG. 6), pulling down on the first cable 50 would not tend to move the second base section 58 relative to the second fly section 28.

The second way of routing is used only on the second ladder sections. When pulled down, the second cable 74 will extend the second fly section 28 relative to the second base section 58, in A mode or straight mode. The second way of routing of the second cable 74, second pulley 66, and second anchor 70 is shown on the second section (second base and fly sections) of FIG. 2. This second way will cause the second fly section 28 to rise in A-mode, or, the second base section 58 to rise in straight mode, when the second cable 74 is pulled downward.

Figure 18:
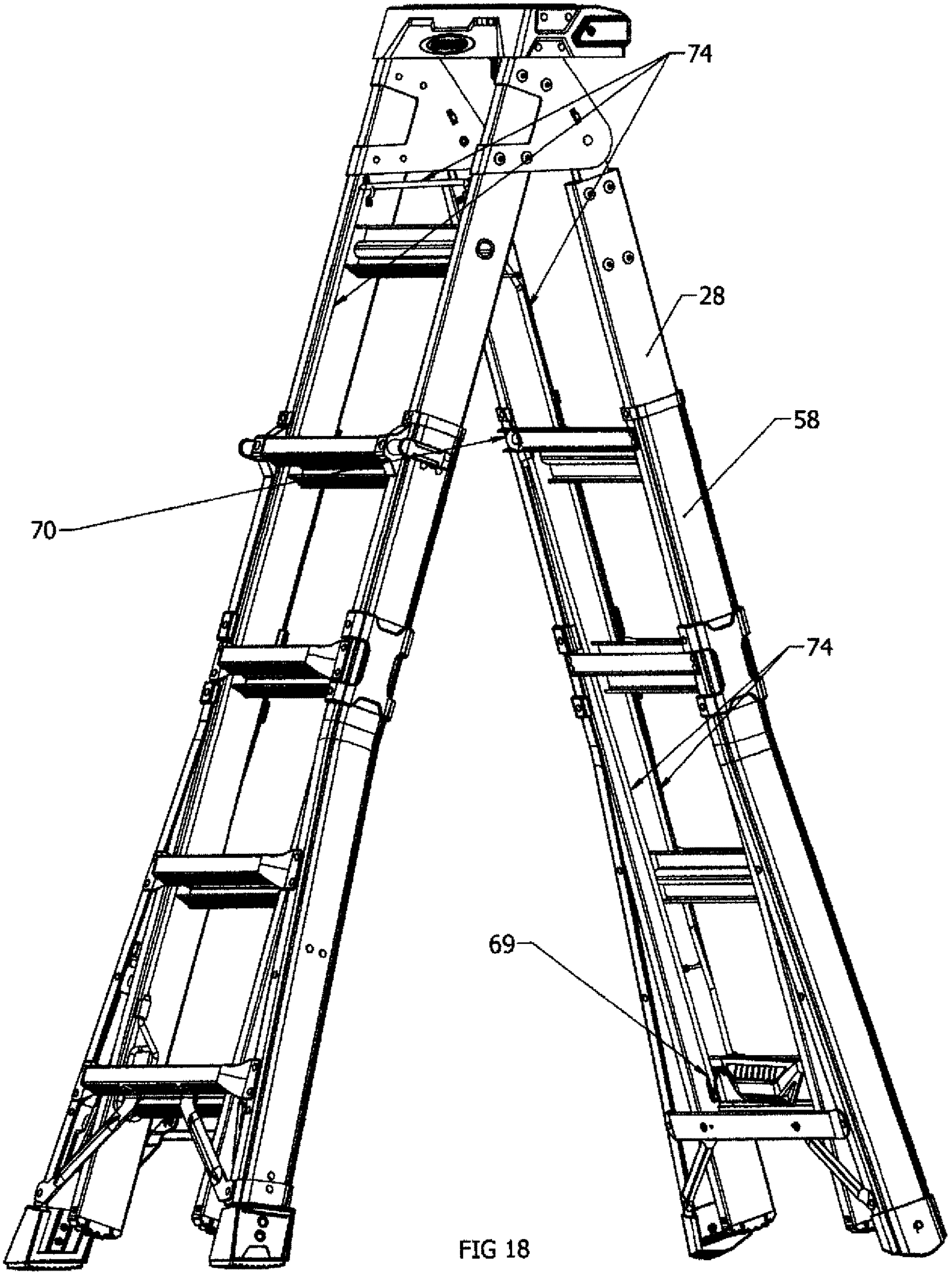
FIG. 18 shows this third way of routing applied to the Tab Lock with Lock.

The third way of routing as seen in FIG. 11 is used only on the second ladder sections. When pulled down, the second cable 74 will extend the second base section 58 relative to the second fly section 28, but only when the ladder 10 is in straight mode as seen in FIGS. 12 and 13. FIG. 18 shows this third way of routing applied to the Tab Lock with Lock, as described in U.S. patent application Ser. No. 17/387,856, incorporated by reference herein. When applied to the tab lock with lock, the second pulley 66 is optional because the user pulls the cable 74 in a nearly straight direction, as seen in FIG. 12, which shows yet a third way of routing the second cable 74, second anchor 70, and second pulley 66 on the second section. This third way will not cause the second fly section 28 to move relative to the second base section 58 if the ladder 10 is in A-mode and the second cable 74 is pulled downward. However, if the ladder 10 is in straight mode, pulling downward on the second cable 74 will cause the second base section 58 to rise relative to the second fly section 28.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A ladder comprising:

a first fly section having a first fly right rail, a first fly left rail in parallel and spaced relation with the first fly right rail, and a plurality of first fly horizontal support members attached to the first fly left rail and first fly right rail;

a first articulated hinge attached to the first fly right rail and a second articulated hinge attached to the first fly left rail;

a second fly section having a second fly right rail, a second fly left rail in parallel and spaced relation with the second fly right rail, and a plurality of second fly horizontal support members attached to the second fly left and right rails, the second fly right rail attached to the first articulated hinge and the second fly left rail attached to the second articulated hinge so the second fly section can rotate about the first and second articulated hinges relative to the first fly section;

a first base section having a first base right rail, a first base left rail in parallel and spaced relation with the first base right rail, and a plurality of first base horizontal support members attached to the first base left and right rails;

a second base section having a second base right rail, a second base left rail in parallel and spaced relation with the second base right rail, and a plurality of second base horizontal support members attached to the second base left and right rails, the second base right rail adjacent the second fly right rail with the second fly right rail sliding relative to the second base right rail;

wherein the first base section and the first fly section are slidable relative to one another between a first contracted position and a first extended position to extend or contract a length of the ladder and the second base section and the second fly section are slidable relative to one another between a second contracted position and a second extended position to extend or contract the length of the ladder, and wherein the ladder has an extended straight configuration in which the first fly section, the second fly section, and the second base section are disposed above the first base section with the first fly section and the first base section in the first extended position and the second fly section and the second base section in the second extended position;

further comprising a pulley attached to one of the second fly horizontal support members of the second fly section adjacent a bottom of the second fly section;

an anchor at the second base section adjacent a top of the second base section;

a cable having a free end hanging freely from the ladder and not anchored thereto and a fixed end, the fixed end attached to the anchor, the cable extending from the anchor about the pulley and past the pulley such that when the free end is pulled by a user standing on a ground when the ladder is standing on the ground in a straight configuration, the second base section is raised upwards relative to the ground and relative to the second fly section to the second extended position.

2. The ladder of claim 1 wherein pulling the cable downwardly when the ladder is standing on the ground in the straight configuration causes the second base section to be raised upwards relative to the ground and relative to the second fly section to the second extended position.

3. The ladder of claim 1 wherein the anchor is disposed on one of the second base horizontal support members of the second base section adjacent the top of the second base section.

4. The ladder of claim 1 further comprising a first locking assembly engaged with the second base section and the second fly section which locks the second base section and the second fly section in place relative to one another in a locked state and permits the second base section and the second fly section to slide relative to one another in an unlocked state.

5. The ladder of claim 1, wherein the first articulated hinge is attached to a top of the first fly right rail and the second articulated hinge is attached to a top of the first fly left rail.

6. The ladder of claim 1, wherein a pulling force on the free end of the cable when the ladder is standing on a ground in an A configuration causes the second fly section to be raised upwards relative to the ground and relative to the second base section.

7. The ladder of claim 1, wherein the ladder is configurable between the straight configuration and a fully extended straight configuration, wherein in the fully extended straight configuration the first fly section is raised upwards relative to the first base section and the second base section is raised upwards relative to the second fly section.

8. The ladder of claim 1, wherein the ladder is configurable between an A configuration and a fully extended A configuration, wherein in the fully extended A configuration the first and second fly sections are raised upwardly relative to the first and second base sections.

9. The ladder of claim 8, wherein in the fully extended A configuration the first articulated hinge and the second articulated hinge are disposed at a topmost portion of the ladder.

* * * * *